(12) United States Patent
Gilman et al.

(10) Patent No.: US 6,679,636 B1
(45) Date of Patent: Jan. 20, 2004

(54) METHOD AND APPARATUS FOR MAINTAINING ALIGNMENT OF A LASER DIODE WITH AN OPTICAL FIBER

(75) Inventors: Ernest Charles Gilman, Portland, OR (US); Dana L. Patelzick, West Linn, OR (US); Richard A. Booman, Lake Oswego, OR (US); Edward L. Hershberg, Portland, OR (US)

(73) Assignee: Network Elements, Inc., Beaverton, OR (US)

( * ) Notice: Subject to any disclaimer, the term of this patent is extended or adjusted under 35 U.S.C. 154(b) by 170 days.

(21) Appl. No.: 09/896,128

(22) Filed: Jun. 29, 2001

(51) Int. Cl.[7] ................................................. G02B 6/36
(52) U.S. Cl. ............................. 385/90; 385/88; 385/89; 385/91; 385/92; 385/93; 385/94; 385/147; 372/36; 372/45
(58) Field of Search ...................... 385/88–94, 147; 372/36, 45

(56) References Cited

U.S. PATENT DOCUMENTS

| 4,119,363 A | 10/1978 | Camlibel et al. |
| 4,702,547 A | 10/1987 | Enochs |
| 4,798,439 A | 1/1989 | Preston |
| 4,936,646 A | 6/1990 | Enochs et al. |
| 4,955,683 A | 9/1990 | Shiga et al. |
| 4,997,253 A | 3/1991 | Enochs |
| 5,307,434 A | 4/1994 | Blonder et al. |
| 5,469,456 A | 11/1995 | Rogers et al. |
| 5,700,987 A | 12/1997 | Basavanhally |
| 6,074,103 A | * 6/2000 | Hargreaves et al. ........... 385/90 |
| 6,146,025 A | 11/2000 | Abbink et al. |
| 6,424,667 B1 | * 7/2002 | Endriz et al. .................. 372/36 |

FOREIGN PATENT DOCUMENTS

| JP | 03-142892 A | * 6/1991 | ................... 372/45 |

* cited by examiner

Primary Examiner—Audrey Chang
Assistant Examiner—Craig Curtis
(74) Attorney, Agent, or Firm—Schwabe, Williamson & Wyatt, P.C.

(57) ABSTRACT

A method and apparatus for maintaining an alignment of a laser diode with an optical fiber is disclosed. A mounting plate is made of a first material, and mounted on the mounting plate is a first substrate made of a second material. A semiconductor laser, with a light emitting side, is mounted on the first substrate. Separated from the first substrate by a predetermined distance is a second substrate made of a third material, and mounted on the second substrate is an optical fiber. The optical fiber is mounted, such that, the optical fiber is adjacent to and aligned with the light emitting side of the semiconductor laser. The first, second, and third materials making up the mounting plate, the first substrate, and the second substrate respectively, facilitate maintenance of the alignment between the optical fiber and the light emitting side of the semiconductor laser.

39 Claims, 2 Drawing Sheets

METHOD AND APPARATUS FOR MAINTAINING ALIGNMENT OF A LASER DIODE WITH AN OPTICAL FIBER

FIELD OF INVENTION

The invention relates to the field of optical components. More specifically, the invention relates to maintaining alignment of a laser diode with an optical fiber.

BACKGROUND OF THE INVENTION

An important aspect of optical components, such as optical components used in telecommunications and data communications technology (i.e., lightwave communications), is the alignment of a light source with a light transmission medium. For example, a semiconductor laser aligned with an optical fiber. Because the light emitted from the semiconductor laser is transmitted via the optical fiber, the alignment between the semiconductor laser and the optical fiber is an important aspect of the optical components.

The alignment of the semiconductor laser with the optical fiber is commonly referred to as coupling. The efficiency of the transmission of power from one medium to another (i.e., semiconductor laser to optical fiber) is commonly referred to as coupling efficiency.

Prior to operation, aligning a semiconductor laser with an optical fiber may have low coupling efficiencies, approximately 10% corresponding to a loss in power of approximately 10 decibels. The low coupling efficiencies may be attributable to factors such as size and shape differences in spot sizes between the semiconductor laser and the optical fiber, absorption, reflectance, scattering, tolerances of the components and alignment methods involved, and so forth. With so many factors contributing to low coupling efficiencies, a great deal of effort is expended to increase the coupling efficiencies and reduce the loss in power.

Efforts to increase the coupling efficiencies may involve focusing the light from the semiconductor laser to the optical fiber, modifying the optical fiber end, through which the optical fiber receives the light, reducing the tolerances, and so forth. Additionally, certain thermal methods of attaching the optical fiber on an optical fiber mounting block may affect the alignment. The efforts involved in increasing the coupling efficiencies and reducing the power loss often correspond to increases in costs, complexity, and size. As a result, once a desired coupling efficiency is achieved, maintaining the desired coupling efficiency is important. However, maintaining the desired coupling efficiency during operation is difficult.

During operation, maintaining the desired coupling efficiency can be difficult due to many factors. One factor, in particular, is the thermal characteristics of materials involved in the optical components.

For example, the semiconductor laser may have a temperature characteristic, whereby, during operation, as the temperature of the semiconductor laser increases, the required operating current of the semiconductor laser also increases. In order to control the temperature of the semiconductor laser, the semiconductor laser may be mounted on a heatsink, where the heatsink conducts heat away from the semiconductor laser at a rate corresponding to the thermal conductivity of the material of the heatsink. Because the heatsink absorbs the heat from the semiconductor laser, the heatsink increases in temperature, as well. Subsequently, the heat in the heatsink, itself, must be removed or the rate at which the heat is transferred from the semiconductor laser to the heatsink will decrease, and ultimately stop.

Additionally, the alignment between the semiconductor laser and the optical fiber may change due to thermal properties of the heatsink, such as the coefficient of thermal expansion (CTE). The CTE is a thermal property of a material describing dimensional changes corresponding to temperature changes in the material.

One method for removing the heat from the semiconductor laser may involve an active heat removal device, such as, a Peltier effect device. Due to size constraints of optical components, active heat removal methods result in increased complexity and cost.

As described above, due to the many factors affecting coupling efficiencies, changes in alignment, due to thermal properties of the optical components, may result in power loss between the semiconductor laser and the optical fiber.

BRIEF DESCRIPTION OF DRAWINGS

The invention is illustrated by way of example and not by way of limitation in the figures of the accompanying drawings, in which the like references indicate similar elements and in which.

DETAILED DESCRIPTION OF THE INVENTION

In the following description, various aspects of the invention will be described. However, it will be apparent to those skilled in the art that the invention may be practiced with only some or all described aspects. For purposes of explanation, specific numbers, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Various operations will be described as multiple discrete steps in turn, in a manner that is most helpful in understanding the invention. However, the order of description should not be construed as to imply that these operations are necessarily order dependent. In particular, these operations need not be performed in the order of presentation.

In various embodiments of the invention, an improved way of maintaining alignment between a semiconductor laser and an optical fiber is facilitated. This and other advantages will be evident from the disclosure.

Figure 1:
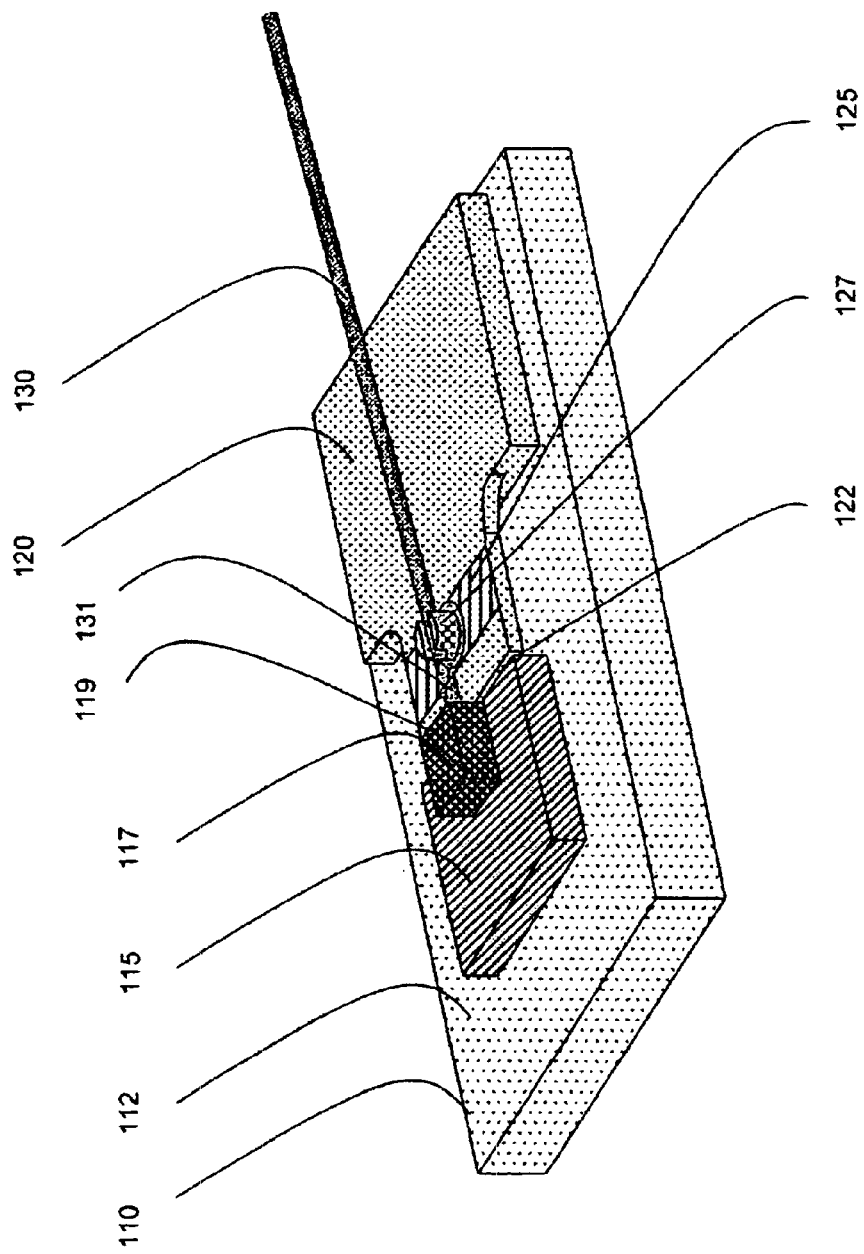
FIG. 1 illustrates an example of an assembly of optical components, where an alignment between a semiconductor laser and an optical fiber is maintained utilizing thermal properties of various materials, in accordance with one embodiment of the present invention.

FIG. 1 illustrates an example of an assembly of optical components, where an alignment between a semiconductor laser and an optical fiber is maintained utilizing thermal properties of various materials, in accordance with one embodiment of the present invention. Shown in FIG. 1 is an assembly of optical components 100, such as optical components used in telecommunications and data communications technology (i.e., lightwave communications). The assembly 100 includes a mounting plate 110 having a substantially flat surface 112 for mounting various substrates and components, including optical, electronics, and optoelectronic components. The mounting plate 110 is of a material, which is a good conductor of heat and electrically conductive. For example, the material for the mounting plate 110 may be a copper (Cu) and tungsten (W) alloy such as, but not limited to, CuW alloys with varying alloy percentages ranging from 10%–5% Cu and 90%–85% W, respectively. The material for the mounting plate 110 may also be Cu and Molybdenum (Mo) alloys such as, but not limited to, CuMo alloys with varying alloy percentages ranging from 15%–20% Cu and 85%–80% Mo, respectively. Another material for the mounting plate 110 may also be of pure Mo.

Some of the thermal properties, in particular, for the mounting plate 110 materials include thermal conductivity and coefficient of thermal expansion (CTE). For the CuW alloys, thermal conductivity values may range from 160–185 watts per meter squared Kelvin per meter (W/m$^2$K/m). The coefficient of thermal expansion for the CuW alloys may range from 6.1–7.36 microns per meter degree Celsius ($\mu$m/m° C.) linear measured at 20° C. For the CuMo alloys, the thermal conductivity values may range from 140–175 W/m$^2$K/m with CTE values ranging from 6.5–7.2 $\mu$m/m° C. linear at 20° C. For pure Mo, the thermal conductivity value may be 138 W/m$^2$K/m with a CTE value of 5.35 $\mu$m/m° C. linear at 20° C.

Additionally shown in FIG. 1, is a first substrate 115 mounted on the surface 112 of the mounting plate 110. Mounted on the first substrate 115 is a semiconductor laser 117 having a light emitting side 119. The first substrate 115 is of a material, which is a good conductor of heat but electrically insulating. For example, the material for the first substrate may be an aluminum (Al) based ceramic such as, but not limited to, Aluminum Nitride (AlN) with varying purity levels ranging from 98%–99%. The material for the first substrate may also be an oxide of beryllium such as, but not limited to, Beryllia (BeO) with a purity of 99.5%.

Some of the thermal properties, in particular, for the first substrate 115 materials also include thermal conductivity and CTE. For the AlN ceramics ranging from 98%–99% purity, the thermal conductivity values may range from 90–170 W/m$^2$K/m. The CTE for the AlN ceramics ranging from 98%–99% purity may range from 4.2–4.3 $\mu$m/m° C. linear measured at 20° C. For Beryllia (BeO) with a purity of 99.5%, the thermal conductivity value may be 248 W/m$^2$K/m with a CTE value of 6.4 $\mu$m/m° C. linear at 20° C.

Also mounted on the surface 112 of the mounting plate 100 is a second substrate 120. The second substrate 120 is separated from the first substrate 115 by a predetermined distance 122 along the surface 112 of the mounting plate 110. As will be described in more detail below, the predetermined distance 122 facilitates isolation of heat within the second substrate 120. The second substrate 120 is of a material, which is a good insulator of heat and also electrically insulating. For example, the material for the second substrate 120 may be an aluminum (Al) based ceramic such as, but not limited to, aluminum oxide (Al$_2$O$_3$), also commonly referred to as Alumina, with a purity of 99.9%.

Some of the thermal properties, in particular, for the second substrate 120 material also include thermal conductivity and CTE. For Alumina with a purity of 99.9%, the thermal conductivity value may be 28 W/m$^2$K/m. The CTE for the Alumina with a 99.9% purity is 7.4 $\mu$m/m° C. linear measured at 250° C.

In one embodiment shown in FIG. 1, an optical fiber 130 is mounted on the second substrate by a predetermined quantity of solder material 127 on an optical fiber attachment area 125. The solder material 127 may be of a preformed type and placed on the second substrate 120. The optical fiber 130 is placed on the solder material 127 and is oriented such that a light input end 131 is adjacent to and aligned with the light emitting side 119 of the semiconductor laser 117 mounted on the first substrate 115. Once a desired alignment is achieved, the solder material 127 is heated to a predetermined temperature to melt the solder material 127. The heating may be facilitated by applying a variety of methods, such as, but not limited to, applying a current to resistive material included in the optical fiber attachment area 125 with the solder material 127. Subsequently, if the current is removed from the optical fiber attachment area 125, the optical fiber attachment area cools back to ambient temperature, re-solidifying the solder material 127. Another example may be a method involving applying heat from coherent and incoherent infrared sources and the like.

Furthermore, because of the heat that may be introduced to the optical fiber attachment area 125, in the embodiment shown in FIG. 1, the optical fiber attachment area 125 comprises a shelf formation above the mounting plate 110. The shelf formation further facilitates isolation of heat within the second substrate 120. The shelf formation may be formed by reducing the thickness of the second substrate 120, in and around the area of the optical fiber attachment area 125 (i.e., below), while maintaining horizontal alignment on the top surface of the second substrate 120.

The shelf formation also helps to decrease the thermal mass of the second substrate 120 thereby isolating any heat within a small confined area. Additionally, the small confined area facilitates rapid heating, while reducing the amount of latent heat that may be present in the second substrate 120.

When the melted solder material 127 is allowed to re-solidify, the re-solidified solder material 127 attaches the optical fiber 130 to the second substrate 120. The predetermined temperature will depend upon the material used for the solder. The solder material 127 may be of any type of low melting point solder, such as, but not limited to, an alloy of lead and tin (PbSn) with a melting point below that of 240° C. Alternatively, the solder material 127 may be of any type of high melting point solder, commonly known as stiff solder, such as, but not limited to, an alloy of gold and tin (AuSn) with a melting point of approximately 280° C.

Utilizing the above described thermal properties of the materials for the mounting plate 110, the first substrate 115, the second substrate 120, and the arrangement of the substrates 115 & 120, the desired alignment between the semiconductor laser 117 and the optical fiber 130 is maintained.

Prior to operation, a factor that may affect the alignment is the heat applied to the second substrate 120 during the mounting of the optical fiber 130. In one embodiment, because the second substrate 120 increases in temperature to melt the solder ball 127, the selected material for the second substrate 120 has a low thermal conductivity and a low CTE, or at least a CTE measurable at relatively high temperatures. These thermal properties help prevent heat transfer from the second substrate 120 to the first substrate 115. Additionally, the combination of the relatively low melting point of the solder material 127 with the low CTE of the material for the second substrate 120, allows for very small, if not negligible, dimensional changes in the second substrate 120. However, if the heat applied to melt the solder material 127, during the mounting of the optical fiber 130, is allowed to transfer to the first substrate 115, the dimensions of the first substrate 115 may change.

The dimensional change is based at least upon the thermal properties of the material of the first substrate 120, such as, but not limited to the thermal conductivity and the CTE. The change in the first substrate 115 causes the position of the semiconductor laser 117 mounted on the first substrate 115 to move, thereby affecting the alignment between the semiconductor laser 117 and the optical fiber 130. In order to minimize any heat transfer from the second substrate 120 to the first substrate 115, the second substrate 120 is separated from the first substrate 115 by the predetermined distance 122 along the surface 112 of the mounting plate 110. The predetermined distance may be any distance required to minimize heat transfer, such as, but not limited to, 0.5 millimeter because heat transfer occurs more readily through conductive rather than convective heat transfer.

During operation, a factor that affects the alignment between the semiconductor laser 117 and the optical fiber 130 is the heat generated by the operation of the semiconductor laser 117. The effect on the optical alignment has, in turn, a detrimental effect on the coupling efficiency. Because of the detrimental effects of heat on optical components, the heat generated by the semiconductor laser 117 is removed.

The heat generated by the semiconductor laser 117 is transferred to the first substrate 115, where the first substrate acts as a heatsink. In turn, the heat from the first substrate 115 is transferred to the mounting plate 112, where the heat may be further removed. The rate, at which the heat is transferred from one component to another is based at least upon the thermal properties of the components, such as, but not limited to, the thermal conductivity. Additionally, as the heat is transferred into a component, the component may dimensionally change based at least upon the thermal properties of the material of the component, such as, but not limited to, the CTE. Utilizing the thermal properties of the materials of the components, the alignment between the semiconductor laser 117 and the optical fiber may be maintained during operation.

In one embodiment, the material for the mounting plate 110 is a good conductor of heat, such as, but not limited to, an alloy of 10% Cu and 90% W. An example of a 10%Cu and 90%W alloy may be a material known as Thermkon® 62 supplied by CMW, Inc. of Indianapolis, Ind. Thermkon® has a thermal conductivity value of 160 W/m$^2$K/m and a CTE of 6.1 $\mu$m/m° C., as information provide by CMW, Inc.

Mounted on the mounting plate 110 made of the good conductor of heat, is the first substrate 115 made of a material that is also a good conductor of heat, such as, but not limited to an AlN ceramic substrate of 99% purity. The 99% AlN ceramic material may be a material known as AN 160 supplied by MarkeTech International of Port Townsend, Wash. The AN 160 has a thermal conductivity value of 155 W/m$^2$K/m and a CTE of 4.3 $\mu$m/m° C., as information provided by MarkeTech International. Mounted on the first substrate 115 is the semiconductor laser 117. The semiconductor laser 117 may be of any type of semiconductor lasers known in the art, such as, but not limited to, the semiconductor lasers from the family fabricated in gallium aluminum arsenide (GaAlAs), and so forth.

Mounted on the mounting plate 110 made of Thermkon® and adjacent to the first substrate 115 made of AN 160, the second substrate 120 a material that has a low thermal conductivity, such as, but not limited to, a ceramic material of aluminum oxide ($Al_2O_3$). The aluminum oxide may be a material known as Alumina with a thermal conductivity value of 28 W/m$^2$K/m and a CTE of 7.4 $\mu$m/m° C. Additionally, mounted on the second substrate 120 made of Alumina, is the optical fiber 130. As previously described, the optical fiber 130 may be attached to the second substrate 120 by the solder material 127. The light input end 131 is adjacent to and aligned with the light emitting side 119 of the semiconductor laser 117 mounted on the first substrate 115.

It should be appreciated by those skilled in the art that the mounting of the substrates 115 & 120 onto the mounting plate 110 may be achieved by utilizing adhesives, including solder, that complement the thermal properties of the materials of the substrates 115 & 120 and the mounting plate 110. Additionally, mounting the semiconductor laser 117 onto the first substrate 115 may be achieved by utilizing adhesives that complement the thermal properties of the materials of the first substrate 115 and the semiconductor laser 117. Furthermore, the adhesives utilized may be thin enough to have very little or no appreciable affects on the thermal properties of the materials. For the purposes of describing the present invention, the adhesives used may be either complementary materials or thin enough to have very little or no appreciable affects on the thermal properties of the optical components.

The combination of the materials in the one embodiment is based at least upon the thermal properties of the materials. Alumina, the material for the second substrate 120 having a thermal conductivity value of 28 W/m$^2$K/m, helps to thermally isolate any heat applied to the second substrate. As previously described, prior to operation, heat may be applied to the second substrate 120 during the mounting of the optical fiber 130 to the second substrate 120.

During operation, AlN ceramic, the material for the first substrate 115 having a thermal conductivity value of 155 W/m$^2$K/m, helps to transfer heat generated by the semiconductor laser 117 away from semiconductor laser 117. In turn, an alloy of 10% Cu and 90% W, the material for the mounting plate 110 having a thermal conductivity value of 160 W/m$^2$K/m, helps transfer heat from the first substrate 115 away from the substrate 115.

The thermal conductivity values of the first substrate 115 and the mounting plate 110 are relatively high as compared to the second substrate 120. As previously described, the thermal conductivities of the first substrate 115 and the mounting plate 110 are selected to transfer heat at a high rate from the semiconductor laser 117 to prevent detrimental heat effects of an increase in temperature to the operation of the semiconductor laser 117.

However, the detrimental effects of loss in coupling efficiency, due to changes in alignment between the semiconductor laser 117 and the optical fiber 130, is controlled by utilizing the thermal properties of CTE of the materials. In the one embodiment, the mounting plate 110 has a CTE of 6.1 $\mu$m/m° C. linear at 20° C. Mounted on the mounting plate 110 is the first substrate 115 having a CTE of 4.3 $\mu$m/m° C. linear at 20 ° C. Also mounted on the mounting plate 110 is the second substrate 120 having a CTE of 7.4 $\mu$m/m° C. linear at 250° C. Because of the high temperature requirements for the CTE of the second substrate 120, the second substrate 120 may be considered dimensionally stable, as compared to the mounting plate 110 and the first substrate 115, at the operating temperatures of the semiconductor laser 117.

Any dimensional changes that may occur due to the rise in temperature of the mounting plate 110 will have a very small affect on the alignment because both the first substrate 115 and the second substrate 120 relatively close CTEs. Because of the closeness of the CTEs of the first substrate 115 and the second substrate 120, dimensional changes in the two substrates 115 & 120 due to heating are minimized. For example, during operation, because the CTEs of the first substrate 115 and the second substrate 120 are relatively close, the minimized dimensional change may be no more than plus or minus 0.049 micrometers, which may be within optical fiber to semiconductor laser alignment specifications.

As a result, selecting materials with predetermined thermal properties, and arranging the materials in a predetermined manner facilitate maintaining alignment between a semiconductor laser and an optical fiber. Additionally, heat generated by the semiconductor laser is removed passively (i.e., without the need for active cooling).

Figure 2:
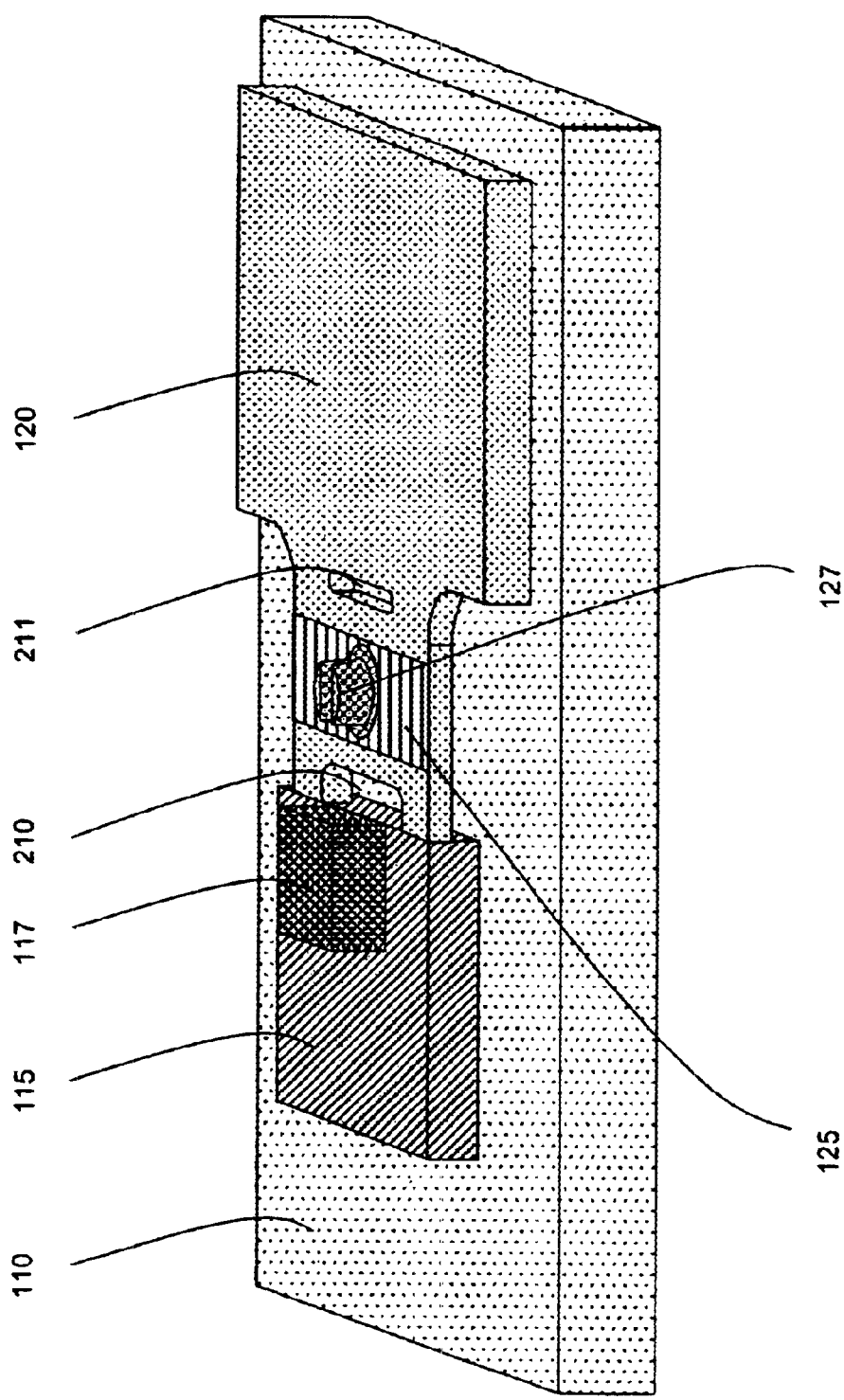
FIG. 2 illustrates an example of an assembly of optical components, where an alignment between a semiconductor laser and an optical fiber is maintained utilizing thermal properties of various materials, in accordance with an alternate embodiment of the present invention.

FIG. 2 illustrates an example of an assembly of optical components, where an alignment between a semiconductor laser and an optical fiber is maintained utilizing thermal properties of various materials, in accordance with an alternate embodiment of the present invention. Shown in FIG. 2, the first substrate 115 is mounted on the mounting plate 110. Additionally, the first substrate 115 has the semiconductor laser 117. In FIG. 2, the second substrate 120 located in a position that is substantially in contact with the first substrate 115. However, the second substrate 120 has thermal features 210 & 211, and in one embodiment, the thermal features 210 are variations of slots (i.e., oval shaped holes in the second substrate 120).

As shown, a first thermal feature 210 is located adjacent to one side of the optical fiber attachment area 125 and at the interface of the first substrate 115 and the second substrate 120. The first thermal feature 210 is a half slot shape occupying approximately 50% of the surface area immediately adjacent the optical fiber attachment area 125. Furthermore, the first thermal feature 210 is shaped in such a way as to allow for contact between the first substrate 115 and the second substrate 120 beyond either end of the first thermal feature 210.

A second thermal feature 220 is located adjacent to the other side of the optical fiber attachment area 125. The second thermal feature is a full slot occupying approximately 50% of the surface area immediately adjacent the optical fiber attachment area 125.

The thermal features 210 & 220 help to isolate any heat retained in the optical fiber attachment area 125 from the first substrate 115. As previously described, prior to operation, the optical fiber attachment area 125 may have heat from the melting of the solder material 127. This heat is isolated from being, conducted to the first substrate 115 where it may detrimentally affect the alignment between the semiconductor laser 117 and the optical fiber 130. Because the material of the second substrate 120 has a low thermal conductivity, the heat for melting the solder material 127 may be retained for a time based at least upon the rate at which heat is transferred out of the optical fiber attachment area 125 (i.e., latent heat).

Furthermore, as shown in FIG. 2, the optical fiber attachment area 125 comprises of a shelf formation. As previously described, the shelf formation helps to decrease the thermal mass of the second substrate 120 thereby further isolating any heat within a small confined area.

During operation, the thermal features 210 & 220 help prevent latent heat from the optical fiber attachment area 125 to be transferred to the first substrate 115. As previously described, heat from the semiconductor laser 117 has detrimental effects on the alignment between the semiconductor laser 117 and the optical fiber 130, and therefore, additional heat from the second substrate 120 will have even more detrimental effects.

As a result, providing certain mechanical features to the selected materials with predetermined thermal properties, and arranging the materials in a predetermined manner further facilitate maintaining alignment between a semiconductor laser and an optical fiber. In one embodiment, the alignment method of the present invention is used in an optical networking module, with integrated protocol processing and unified software control. Such module is the subject matter of co-pending application number <to be inserted>, entitled "An Optical Networking Module Including Integrated Protocol Processing and Unified Software Control", filed on May 18, 2001 and assigned to the same assignee as the present invention. The application is hereby fully incorporated by reference.

Although the invention had been described and illustrated in detail, it is to be understood that the same is by way of illustration as an example only and is not to be taken by way of limitation.

Thus, an improved way of maintaining alignment between a semiconductor laser and an optical fiber is disclosed.

What is claimed is:

1. An apparatus comprising:
   a mounting plate comprising a first material;
   a first substrate mounted on the mounting plate, the first substrate comprising a second material;
   a semiconductor laser mounted on the first substrate, the semiconductor laser having a light emitting side;
   a second substrate mounted on the mounting plate and separated from the first substrate by a predetermined distance, the second substrate material including a shelf formation above the mounting plate, the second substrate comprising a third material; and
   an optical fiber mounted on the second substrate, the optical fiber being adjacent to and aligned with the light emitting side of the laser, wherein the first, second and third materials being complementary in thermal characteristic to facilitate maintenance of the alignment between the optical fiber and the light emitting side of the laser.

2. The apparatus of claim 1, wherein the first material is a conductor of heat.

3. The apparatus of claim 1, wherein the first material comprises at least one of a CuW alloy, a CuMo alloy, and pure Mo.

4. The apparatus of claim 1, wherein the first material comprises a thermal conductivity value:
   the thermal conductivity value being at least 160 W/m$^2$K/m; and
   the thermal conductivity value being no more than 185 W/m$^2$K/m.

5. The apparatus of claim 1, wherein the first material comprises a coefficient of thermal expansion (CTE) value, and the CTE being linear and measured at 20° C.:
   the CTE value being at least 6.1 $\mu$m/m° C.; and
   the CTE value being no more than 7.36 $\mu$m/m° C.

6. The apparatus of claim 1, wherein the first material comprises a thermal conductivity value:
   the thermal conductivity value being at least 140 W/m$^2$K/m; and
   the thermal conductivity value being no more than 175 W/m$^2$K/m.

7. The apparatus of claim 1, wherein the first material comprises a CTE value, and the CTE value being linear and measured at 20° C.:

the CTE value being at least 6.5 μm/m° C./; and the CTE value being no more than 7.2 μm/m° C.

8. The apparatus of claim 1, wherein the first material comprises a thermal conductivity value of 138 W/m²K/m.

9. The apparatus of claim 1, wherein the first material comprises a CTE value of 5.35 μm/m° C., and the CTE value being linear and measured at 20° C.

10. The apparatus of claim 1, wherein the second material is a conductor of heat.

11. The apparatus of claim 1, wherein the second material comprises at least one of an AlN and BeO.

12. The apparatus of claim 1, wherein the second material comprises a thermal conductivity value:

the thermal conductivity value being at least 90 W/m²K/m; and the thermal conductivity value being no more than 170 W/m²K/m.

13. The apparatus of claim 1, wherein the second material comprises a CTE value, and the CTE value being linear and measured at 20° C.:

the CTE value being at least 4.2 μm/m° C.; and the CTE value being no more than 4.3 μm/m° C.

14. The apparatus of claim 1, wherein the second material comprises a thermal conductivity value of 248 W/m²K/m.

15. The apparatus of claim 1, wherein the second material comprises a CTE value of 6.4 μm/m° C., and the CTE being linear and measured at 20° C.

16. The apparatus of claim 1, wherein the third material is a thermally insulating material.

17. The apparatus of claim 1, wherein the third material is an aluminum oxide.

18. The apparatus of claim 1, wherein the third material comprises a thermal conductivity value of no more than 28 W/m²K/m.

19. The apparatus of claim 1, wherein the third material comprises a CTE value of no more than 7.4 μm/m° C., and the CTE being linear and measured at 250° C.

20. The apparatus of claim 1, wherein the apparatus is an optical networking module.

21. The apparatus of claim 1 wherein the optical fiber is mounted upon the shelf formation of the second substrate material.

22. An apparatus comprising:

a mounting plate, the mounting plate comprising a first material;

a first substrate mounted on the mounting plate, the first substrate comprising a second material; an semiconductor laser mounted on the first substrate, the semiconductor laser having a light emitting side;

a second substrate mounted on the mounting plate substantially in contact with the first substrate, the second substrate material including a shelf formation above the mounting plate, the second substrate comprising a third material; and an optical fiber mounted on the second substrate, the optical fiber being adjacent to and aligned with the light emitting side the laser.

23. The apparatus of claim 22, wherein the first material comprises at least one of a CuW alloy, a CuMo alloy, and pure Mo.

24. The apparatus of claim 22, wherein the first material comprises a thermal conductivity value:

the thermal conductivity value being at least 160 W/m²K/m; and the thermal conductivity value being no more than 185 W/m²K/m.

25. The apparatus of claim 22, wherein the first material comprises a coefficient of thermal expansion (CTE) value, and the CTE being linear and measured at 20° C.:

the CTE value being at least 6.1 μm/m° C.; and the CTE value being no more than 7.36 μm/m° C.

26. The apparatus of claim 22, wherein the first material comprises a thermal conductivity value:

the thermal conductivity value being at least 140 W/m²K/m; and the thermal conductivity value being no more than 175 W/m²K/m.

27. The apparatus of claim 22, wherein the first material comprises a CTE value, and the CTE value being linear and measured at 20° C.:

the CTE value being at least 6.5 μm/m° C./; and the CTE value being no more than 7.2 μm/m° C.

28. The apparatus of claim 22, wherein the first material comprises a thermal conductivity value of 138 W/m²K/m.

29. The apparatus of claim 22, wherein the first material comprises a CTE value of 5.35 μm/m° C., and the CTE value being linear and measured at 20° C.

30. The apparatus of claim 22, wherein the second material comprises at least one of an AlN and BeO.

31. The apparatus of claim 22, wherein the second material comprises a thermal conductivity value:

the thermal conductivity value being at least 90 W/m²K/m; and the thermal conductivity value being no more than 170 W/m²K/m.

32. The apparatus of claim 22, wherein the second material comprises a CTE value, and the CTE value being linear and measured at 20° C.:

the CTE value being at least 4.2 μm/m° C.; and the CTE value being no more than 4.3 μm/m° C.

33. The apparatus of claim 22, wherein the second material comprises a thermal conductivity value of 248 Wm²K/m.

34. The apparatus of claim 22, wherein the second material comprises a CTE value of 6.4 μm/m° C., and the CTE being linear and measured at 20° C.

35. The apparatus of claim 22, wherein the third material is an aluminum oxide.

36. The apparatus of claim 22, wherein the third material comprises a thermal conductivity value of no more than 28 W/m²K/m.

37. The apparatus of claim 22, wherein the third material comprises a CTE value of no more than 7.4 μm/m° C., and the CTE being linear and measured at 250° C.

38. The apparatus of claim 22 wherein the apparatus is an optical networking module.

39. The apparatus of claim 22 Wherein the optical fiber is mounted upon the shelf formation of the second substrate material.

* * * * *